W. J. CROTHERS.
VIEW FINDER FOR CAMERAS.
APPLICATION FILED FEB. 2, 1916.

1,202,675.
Patented Oct. 24, 1916.

Inventor
William J. Crothers.

Witnesses

By Victor J. Evans
Attorney

UNITED STATES PATENT OFFICE.

WILLIAM JOHN CROTHERS, OF TORONTO, ONTARIO, CANADA.

VIEW-FINDER FOR CAMERAS.

1,202,675.  Specification of Letters Patent.  Patented Oct. 24, 1916.

Application filed February 2, 1916. Serial No. 75,818.

*To all whom it may concern:*

Be it known that I, WILLIAM J. CROTHERS, a citizen of the United States, residing at Toronto, in the Province of Ontario and Dominion of Canada, have invented new and useful Improvements in View-Finders for Cameras, of which the following is a specification.

The invention relates to a view finder for cameras, and more particularly to the class of adjustable view finders, especially adaptable for use upon cameras forming the subject matter of a co-pending application filed by me on or about November 15, 1915.

The primary object of the invention is the provision of a finder of this character wherein the user thereof can readily and clearly determine the view to be focused and photographed.

Another object of the invention is the provision of a view finder of this character wherein the viewpoint of a particular landscape or image on the film or plate negative can be accurately ascertained or determined, thereby enabling the centering of the landscape or image and also permitting the truing thereof upon the negative.

A further object of the invention is the provision of a view finder of this character wherein the construction thereof is novel in form to permit one to determine with despatch the area of the view to be photographed to bring the same within the size of the film or plate negative.

A still further object of the invention is the provision of a view finder of this character which is simple in construction, thoroughly reliable and efficient in its purpose, readily and easily adjusted with despatch and inexpensive of manufacture.

Other objects will be in part obvious and in part hereinafter pointed out.

The invention accordingly consists in the features of construction, combination of elements and arrangement of parts which will be exemplified in the construction hereinafter set forth, and the scope of the application of which will be indicated in the claims hereunto appended.

Figure 1:
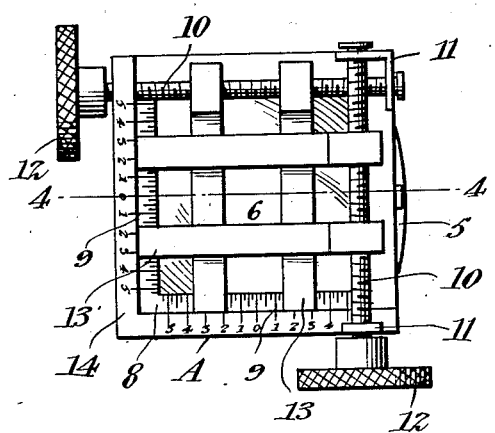
Figure 2:
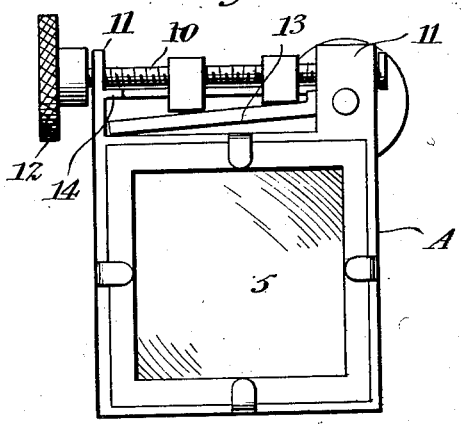
Figure 3:
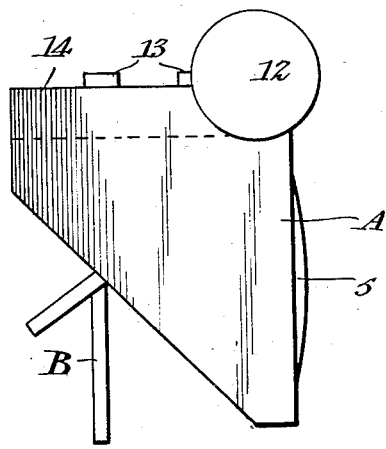
Figure 4:
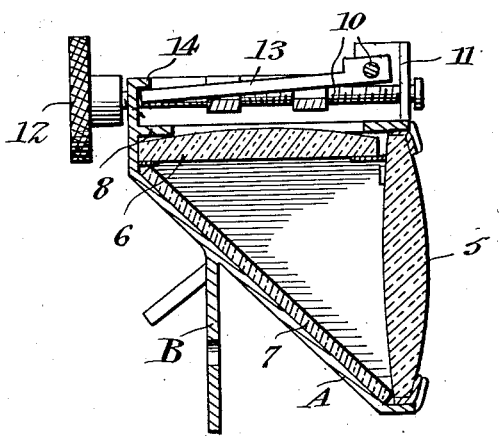

In the accompanying drawings: Figure 1 is a top plan view of a view finder constructed in accordance with the invention; Fig. 2 is a front elevation thereof; Fig. 3 is a side view thereof; and Fig. 4 is a fragmentary vertical sectional view on the line 4—4 of Fig. 1.

Similar reference characters indicate corresponding parts throughout the several views of the drawing.

Referring to the drawing in detail, A designates generally the body of the view finder having formed therefrom or mounted thereon the usual bracket B for the adjustable connection or mounting thereof on a camera, the finder being fitted with the lenses 5 and 6 respectively, arranged at right angles to each other at the front and top of the body A, and the reflecting mirror 7 which is disposed at an angle in the ordinary well known manner for transferring the view from the lens 5 to the lens 6 so that it can be readily observed by the user of the finder for ascertaining with accuracy such view for the photographing thereof.

Formed on the top of the body A is a marginal frame 8 about the lens 6, and upon two sides of this frame are marked or otherwise indicated graduated scales 9, each being in accordance with the area of the film or plate negative within the camera, while at the other side of the frame 8 are mounted adjusting screws 10 which are journaled in bearings 11 integral with or mounted upon the body A of the finder, and on one end of each of these screws 10 is formed a knurled head 12 so that it can be manually turned for a purpose presently described. Each screw 10 is reversely threaded from the center thereof in a direction toward the outer end of the same and engaging these threads are adjustable indicator arms 13 which are arranged in pairs upon the respective screws 10 so that on the turning thereof the said arms 13 of each pair will approach each other or move outwardly away from one another, the arms being designed to slide over the scales 9 so as to indicate the area of the view to be photographed and thereby enabling the user of the finder to determine with accuracy and clearness the size of the view for the photographing of the same and the centering thereof on the film or plate negative within the camera when an exposure is made.

Formed on the frame 8 and co-extensive with the scales 9 thereon are guides 14, beneath which are engaged the arms 13 to prevent the same from swinging away from the frame when the finder is turned when positioning the camera either vertically or horizontally for the making of a vertical or a horizontal exposure.

It will be noted that the arms 13 cross each other so that the view visible in the finder can be marginally framed and on the adjustment of the said arms the size thereof varied so that the size of the camera image, on an exposure of the film or plate within the camera, can be accurately determined, and at the same time the user of the camera can ascertain whether or not the view will be centered in the film or plate, or will be true thereon.

It is of course to be understood that this particular construction of finder is adaptable especially to the type of cameras forming the subject matter of my co-pending application, filed on or about November 15, 1915, and serially numbered 61644.

From the foregoing description, taken in connection with the accompanying drawings, the construction and operation of the invention will be readily apparent and a more extended explanation has, therefore, been omitted.

Having thus described my invention, I claim:—

1. The combination with a finder, of a frame about the view face thereof and having graduated scales on two sides of the same, and pairs of adjustably mounted arms disposed in cross relation to each other and coöperative with the scales.

2. The combination with a finder, of a frame about the view face thereof and having graduated scales on two sides of the same, pairs of adjustably mounted arms disposed in crossed relation to each other and coöperative with the scales, and guides for the said arms.

3. The combination with a finder, of a frame about the view face thereof and having graduated scales on two sides of the same, pairs of adjustably mounted arms disposed in crossed relation to each other and coöperative with the scales, guides for the said arms, and means for adjusting the pairs of arms relative to each other supported by the finder.

4. The combination with a finder, of adjustable framing means arranged at the view side thereof and having a scale for accurately determining the size of the view.

In testimony whereof I affix my signature in presence of two witnesses.

WILLIAM JOHN CROTHERS.

Witnesses:
D. S. TOVELL,
H. M. CHRISTMAN.